(12) United States Patent  
Cox et al.

(10) Patent No.: US 9,318,236 B2
(45) Date of Patent: Apr. 19, 2016

(54) MOUNTING DEVICE AND METHOD OF ASSEMBLING THE SAME

(71) Applicant: Unison Industries, LLC, Jacksonville, FL (US)

(72) Inventors: Adam Benjamin Cox, Jacksonville, FL (US); William Ward Owens, Jacksonville, FL (US); Bruce D. Markert, Jacksonville, FL (US); Joseph Chvala, St. Augustine, FL (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 33 days.

(21) Appl. No.: 14/330,328

(22) Filed: Jul. 14, 2014

(65) Prior Publication Data

US 2014/0318861 A1  Oct. 30, 2014

Related U.S. Application Data

(63) Continuation of application No. 13/341,326, filed on Dec. 30, 2011, now Pat. No. 8,796,554.

(51) Int. Cl.
| | |
|---|---|
| *H01B 7/00* | (2006.01) |
| *F16L 3/10* | (2006.01) |
| *F02C 7/32* | (2006.01) |
| *B23P 11/00* | (2006.01) |
| *H01B 17/00* | (2006.01) |

(52) U.S. Cl.
CPC .............. *H01B 7/0045* (2013.01); *B23P 11/00* (2013.01); *F02C 7/32* (2013.01); *F16L 3/10* (2013.01); *H01B 17/00* (2013.01); *Y10T 29/49826* (2015.01); *Y10T 156/10* (2015.01)

(58) Field of Classification Search
CPC ....... H01B 7/0045; H01B 17/00; B23P 11/00; F02C 7/32; F16L 3/10
USPC .............. 174/72 A; 29/428; 248/68.1; 156/60
See application file for complete search history.

(56) References Cited

U.S. PATENT DOCUMENTS

| | | | |
|---|---|---|---|
| 4,750,265 A | 6/1988 | Watanabe et al. | |
| 4,861,278 A * | 8/1989 | McBride | H01R 4/2416 439/395 |
| 5,115,586 A * | 5/1992 | Hawker | G02B 6/4482 40/316 |

(Continued)

OTHER PUBLICATIONS http://www.aircostcontrol.com/?q=202W302-12-0; 1 page ; Dec. 8, 2015.

*Primary Examiner* — Timothy Thompson
*Assistant Examiner* — Charles Pizzuto
(74) *Attorney, Agent, or Firm* — GE Global Patent Operation; William S. Munnerlyn (57) ABSTRACT

A method and system for a mounting device for an electrical harness of a gas turbine engine are provided. The mounting device includes a first and a second semi-cylindrical shell, the first and second shells are hingedly coupled along respective adjacent edges. Each of the first and second shells includes a first end region, a second end region and a middle region extending between the first end region and the second end region. The middle region defines a mounting seat having an outer diameter that is less than an outer diameter of the first end region and the second end region. The mounting device also includes at least one fastener configured to couple the first shell to the second shell with the wire bundle disposed between the first shell and the second shell such that movement of the first shell and the second shell along the wire bundle is restricted.

20 Claims, 4 Drawing Sheets

(56) References Cited

U.S. PATENT DOCUMENTS

| | | | | |
|---|---|---|---|---|
| 5,545,854 A * | 8/1996 | Ishida | ................... | H02G 3/081 16/2.2 |
| 6,248,952 B1 | 6/2001 | Reeves et al. | | |
| 6,599,657 B1 * | 7/2003 | Pollett | ................ | H01M 2/1005 29/623.1 |
| 6,627,817 B1 * | 9/2003 | Kortenbach | ........... | H02G 3/083 174/541 |
| 7,007,900 B2 * | 3/2006 | Goodwin | ............... | H02G 7/053 248/68.1 |
| 7,966,832 B1 | 6/2011 | Lockyer et al. | | |
| 7,973,250 B2 * | 7/2011 | Groeller | ................... | H02G 3/22 138/157 |
| 8,056,346 B2 | 11/2011 | Lockyer et al. | | |
| 2003/0140956 A1 * | 7/2003 | Fargason | .............. | A01M 31/00 114/351 |
| 2010/0258329 A1 | 10/2010 | Engelbach et al. | | |
| 2011/0030377 A1 | 2/2011 | Lockyer et al. | | |
| 2012/0113572 A1 * | 5/2012 | Gaddis, II | ............. | G06F 1/1628 361/679.01 |

\* cited by examiner

MOUNTING DEVICE AND METHOD OF ASSEMBLING THE SAME

CROSS-REFERENCE TO RELATED APPLICATIONS

This application is a continuation of U.S. patent application Ser. No. 13/341,326 filed Dec. 30, 2011, which is hereby incorporated by reference in its entirety.

BACKGROUND

The field of this disclosure relates generally to mounting devices and, more particularly, to a mounting device for an electrical harness of a gas turbine engine.

Most known electro-mechanical systems (e.g., automobiles, aircraft, and watercraft) utilize wires as a medium for providing power or communication amongst their components. Because loose and unorganized wires can create a complex and unwieldy wire network throughout a system, similarly situated wires are often bundled together (e.g., in the form of an electrical harness) to facilitate more easily and properly securing the wires in the system, thereby helping to protect the wires from adverse effects (e.g., vibration, abrasion, moisture, heat, etc.) associated with system operation.

Many known electrical harnesses have an arrangement of mounting devices (e.g., locator grommets or bobbins) that facilitate mounting the harnesses within the associated systems. However, the configuration of wire breakouts and wire connectors of the harness has been known to influence the arrangement of mounting devices on the harness (e.g., the configuration of breakouts and wire connectors has been known to dictate mounting device locations along the harness). It would be useful, therefore, to provide a mounting device that can be arranged on a harness in a manner that is less influenced by the configuration of breakouts and connectors.

BRIEF DESCRIPTION

In one aspect, a mounting device for an electrical harness of a gas turbine engine includes a first semi-cylindrical shell and a second semi-cylindrical shell, the first shell and the second shell hingedly coupled along respective adjacent edges of the first shell and the second shell. Each of the first shell and the second shell includes a first end region, a second end region, and a middle region extending between the first end region and the second end region. The middle region defines a mounting seat having an outer diameter that is less than an outer diameter of the first end region and the second end region. The mounting device further includes at least one fastener configured to couple the first shell to the second shell with the wire bundle disposed between the first shell and the second shell such that movement of the first shell and the second shell along the wire bundle is restricted.

In another aspect, a method of assembling a mounting device for an electrical harness of a gas turbine engine includes providing a first semi-cylindrical shell and a second semi-cylindrical shell, wherein each of the first shell and the second shell includes a middle region extending between a first end region that includes a first shoulder and a second end region that includes a second shoulder, the first shell and the second shell hingedly coupled along respective adjacent edges of the first shell and the second shell and coupling the first shell to the second shell such that the middle regions of the first shell and the second shell form a mounting seat having a first diameter that is less than a diameter of the first shoulder and the second shoulder.

In another aspect, an electrical harness for a gas turbine engine includes a wire bundle including a covering and a plurality of wires disposed within the covering and a mounting device coupled to the wire bundle. The mounting device includes a first shell and a second shell. Each of the first shell and the second shell includes a first end region, a second end region, and a middle region between the first end region and the second end region. The middle region defines a mounting seat having a first diameter that is less than a diameter of the first end region and the second end region. The mounting device also includes at least one fastener configured to couple the first shell to the second shell with the wire bundle disposed between the first shell and the second shell such that movement of the first shell and the second shell along the wire bundle is restricted.

DETAILED DESCRIPTION

The following detailed description sets forth a mounting device and a method of assembling the same by way of example and not by way of limitation. The description should clearly enable one of ordinary skill in the art to make and use the mounting device, and the description sets forth several embodiments, adaptations, variations, alternatives, and uses of the mounting device, including what is presently believed to be the best mode thereof. The mounting device is described herein as being applied to a preferred embodiment, namely an electrical harness for a gas turbine engine. However, it is contemplated that the mounting device and the method of assembling the same may have general application in a broad range of systems other than gas turbine engines (e.g., automobiles, watercraft, spacecraft, etc.) and/or a variety of commercial, industrial, and/or consumer applications other than electrical harnesses (e.g., to mount tubes, hoses, sensors having leads, or ignition leads).

Figure 1:
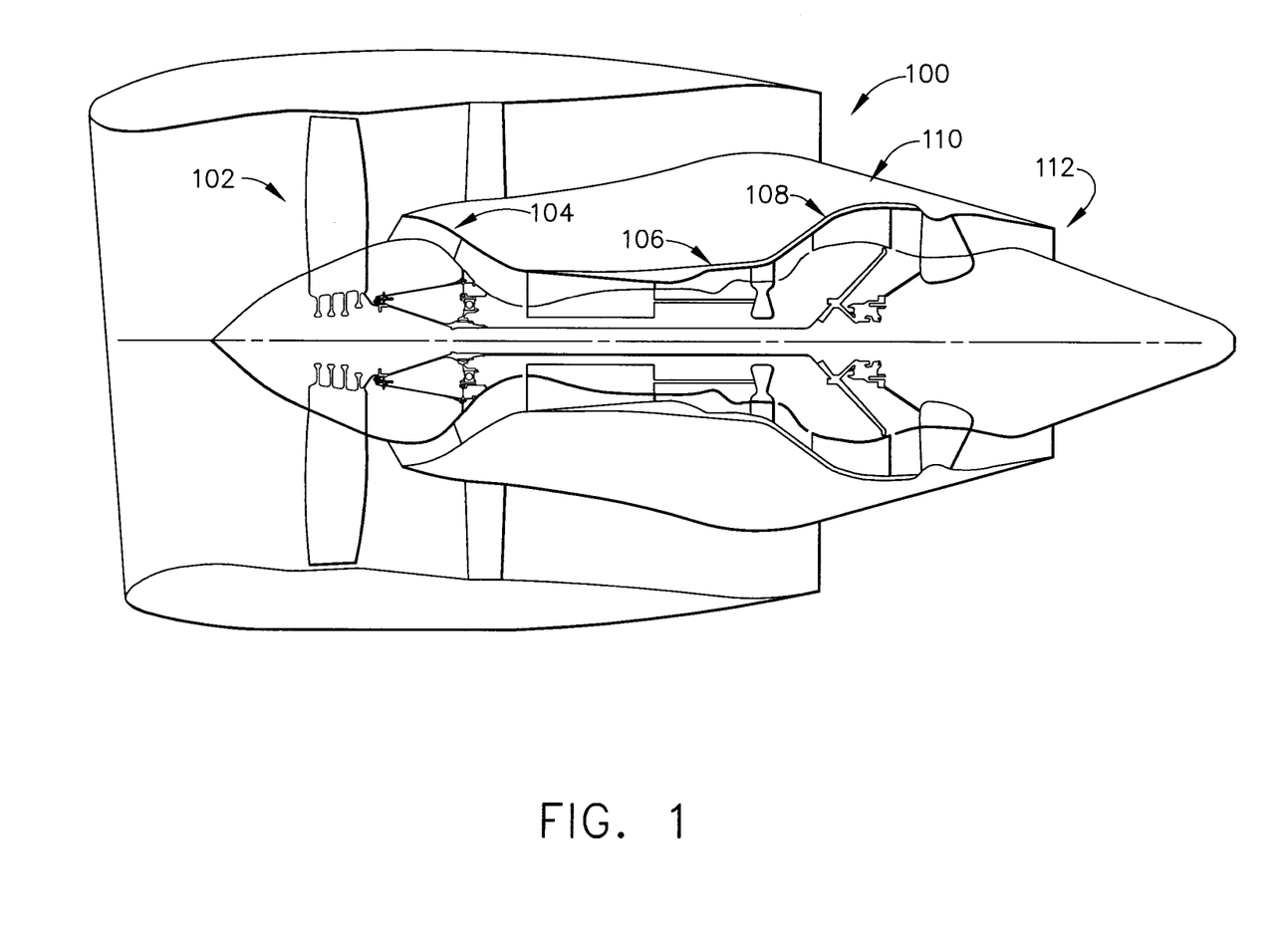
FIG. 1 is a schematic illustration of a gas turbine engine.

FIG. 1 is a schematic illustration of an exemplary gas turbine engine 100 including a fan system 102, a compressor system 104, a combustion system 106, a high pressure turbine system 108, and a low pressure turbine system 110. During operation, ambient air is directed through fan system 102 into compressor system 104, in which the ambient air is compressed and directed into combustion system 106. In combustion system 106, the compressed air is mixed with fuel and ignited to generate combustion gases that are directed through high pressure turbine system 108 and low pressure turbine system 110. The combustion gases are subsequently exhausted from gas turbine engine 100 via an exhaust system 112. In other embodiments, gas turbine engine 100 may include any suitable number of fan systems, compressor systems, combustion systems, and/or turbine systems configured in any suitable manner.

Figure 2:
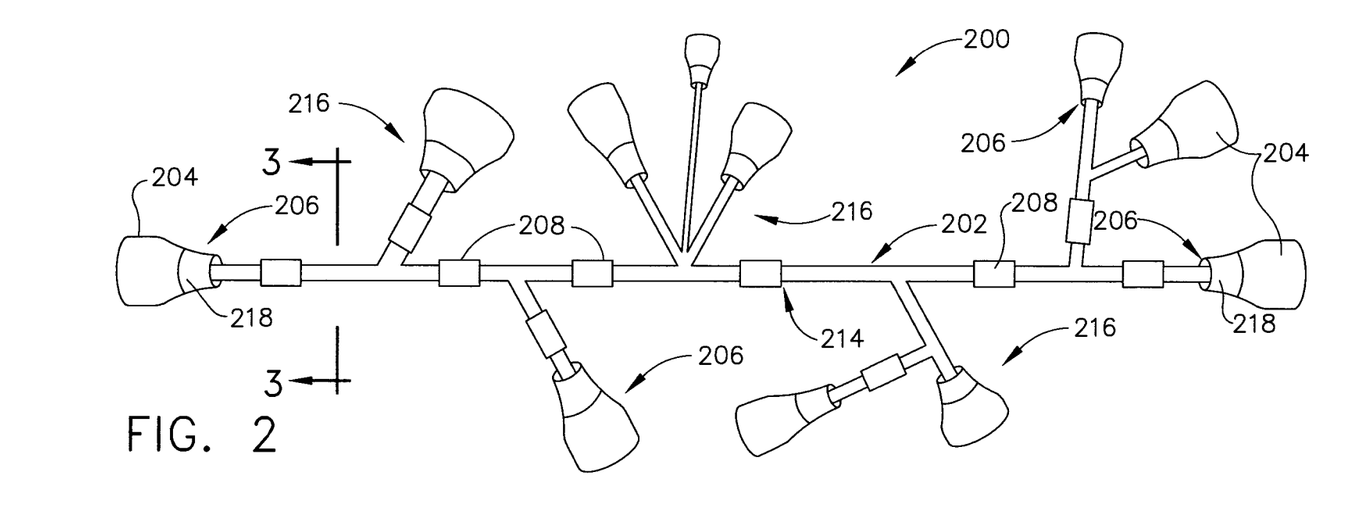
FIG. 2 is a schematic illustration of an electrical harness of the gas turbine engine shown in FIG. 1.
Figure 3:
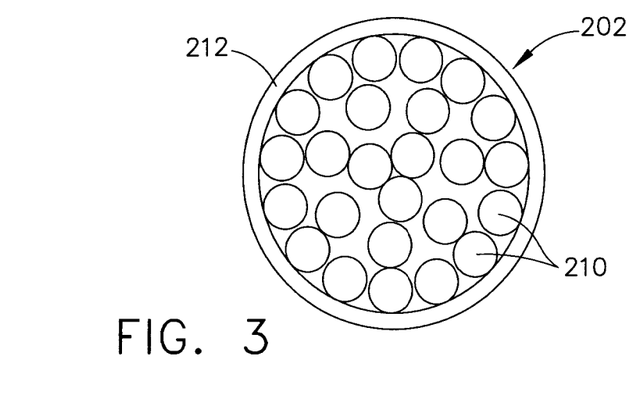
FIG. 3 is a schematic cross-sectional illustration of the electrical harness shown in FIG. 2 and taken along line 3-3.

FIG. 2 is a schematic illustration of an electrical harness 200 for use on gas turbine engine 100, and FIG. 3 is a schematic cross-sectional illustration of electrical harness 200 taken along line 3-3. In the exemplary embodiment, electrical harness 200 includes a wire bundle 202, a plurality of connector assemblies 204 coupled at ends 206 of wire bundle 202, and a plurality of mounting devices 208 coupled at intermediate locations along wire bundle 202 between ends 206. Wire bundle 202 includes a plurality of wires 210 that, in some instances, are disposed within a covering 212 (e.g., at least one layer of a braided material) to facilitate protecting wires 210 from chaffing and/or electromagnetic interference (EMI). Wire bundle 202 has a main segment 214 and a plurality of breakout segments 216 extending from main segment 214, thereby enabling wires 210 to be more easily routed through gas turbine engine 100.

Each connector assembly 204 includes a housing (e.g., a cylindrical back shell 218) and a plurality of electrical pins (not shown) disposed therein such that the housing facilitates protecting and/or supporting an interface between wires 210 and the pins. In the exemplary embodiment, a cross-section of connector assembly 204 (e.g., a diameter of the housing) is larger than a cross-section of wire bundle 202 (e.g., a diameter of covering 212). In other embodiments, connector assembly 204 may have any suitable size and/or shape relative to wire bundle 202. As described in more detail below, mounting devices 208 are coupled to wire bundle 202 (e.g., atop of covering 212) to facilitate mounting electrical harness 200 at desired locations within gas turbine engine 100.

Figure 4:
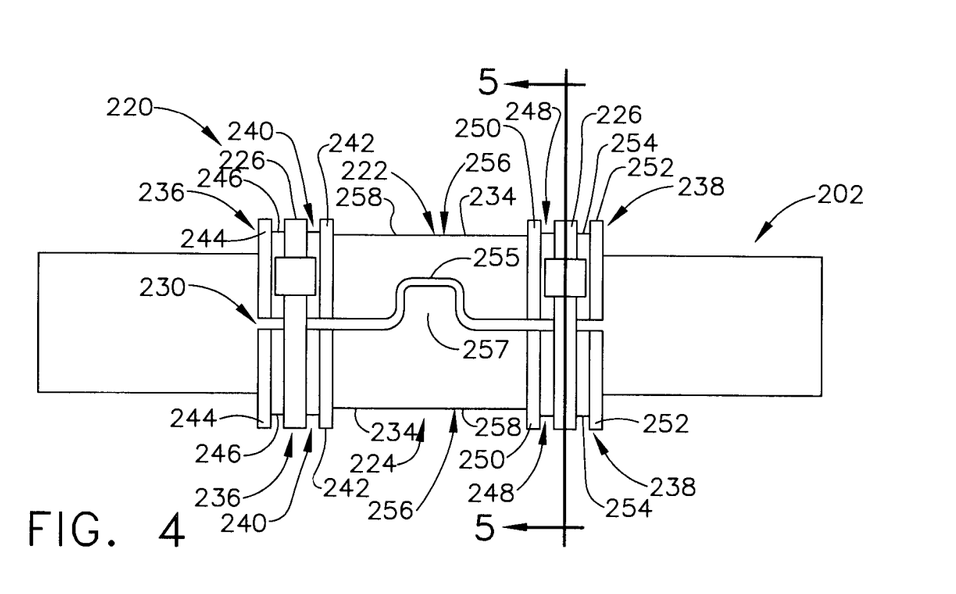
FIG. 4 is a schematic side illustration of a first embodiment of a mounting device of the electrical harness shown in FIG. 2.
Figure 5:
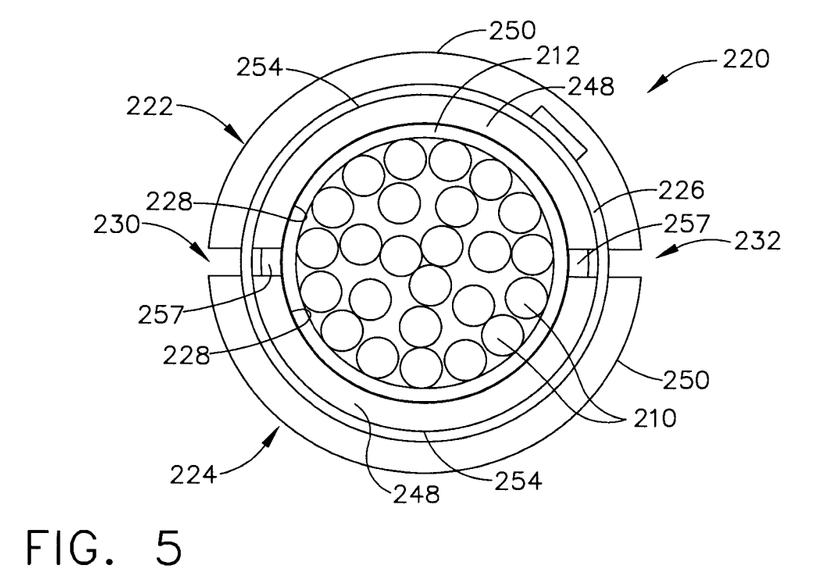
FIG. 5 is a schematic cross-sectional illustration of the mounting device shown in FIG. 4 and taken along line 5-5.

FIG. 4 is a schematic side illustration of a first embodiment of a mounting device 220 for use on electrical harness 200, and FIG. 5 is a schematic cross-sectional illustration of mounting device 220 taken along line 5-5. In the exemplary embodiment, mounting device 220 includes a first shell 222, a second shell 224, and at least one fastener 226 (e.g., a pair of annular band straps or zip ties) coupling first shell 222 to second shell 224 about wire bundle 202, as described in more detail below.

In the exemplary embodiment, first shell 222 and second shell 224 are fabricated from a synthetic or semi-synthetic, organic-based material (e.g., a "plastic" material) rated to at least 200° C. (e.g., to at least 260° C. in one embodiment). The plastic material may be fabricated using any suitable manufacturing process such as, for example, an injection molding process, a compression molding process, and/or a machining process. In some embodiments, the plastic material may be a polyetheretherketone (PEEK) material or a polytetrafluoroethylene (PTFE) material. In the exemplary embodiment, fasteners 226 are fabricated from a metallic material (e.g., a stainless steel material). In other embodiments, first shell 222, second shell 224, and fasteners 226 may be fabricated from any suitable material (e.g., shells 222, 224 may be fabricated from a stainless steel material or other metallic material, and/or fasteners 226 may be fabricated from a PEEK material or other plastic material). If first shell 222 and second shell 224 are fabricated from a metallic material, first shell 222 and second shell 224 may be coupled together using a suitable bonding process (e.g., a welding process), rather than using mechanical fasteners 226 described above.

In the exemplary embodiment, first shell 222 and second shell 224 are generally semi-cylindrically shaped (i.e., first shell 222 and second shell 224 have inner surfaces 228 that are generally arcuate in cross-section) such that, when coupled together, first shell 222 and second shell 224 form a generally cylindrical shape that is sized to receive wire bundle 202. In another embodiment, inner surfaces 228 may have contours that vary along wire bundle 202 to facilitate an improved grip of first shell 222 and second shell 224 on wire bundle 202 (e.g., inner surfaces 228 may have at least one protuberance, such as an arcuately extending ridge, that facilitates gripping wire bundle 202). In other embodiments, first and second shells 222, 224 may be any suitable size and/or shape (e.g., may have inner surfaces 228 that are polygonal in cross-section). In the exemplary embodiment, first shell 222 and second shell 224 are sized such that gaps 230, 232 are defined between first shell 222 and second shell 224 on opposite sides of wire bundle 202 when first shell 222 and second shell 224 are seated against wire bundle 202, thereby enabling first shell 222 and second shell 224 to be displaced toward one another in order to compress wire bundle 202 as described in more detail below. Alternatively, mounting device 220 may have any suitable number of shells configured to be coupled together to form any suitable number of gaps arranged in any suitable manner about wire bundle 202.

In the exemplary embodiment, each of first shell 222 and second shell 224 has an outer surface 234 that is segmented into a first end region 236, a second end region 238, and a middle region 256. Each first end region 236 includes a first shoulder 240 having inner and outer first ribs 242, 244 that are spaced apart to define a first fastener seat 246 therebetween. Similarly, each second end region 238 includes a second shoulder 248 having inner and outer second ribs 250, 252 that are spaced apart to define a second fastener seat 254 therebetween. Extending from first end region 236 to second end region 238 is middle region 256, which defines a mounting seat 258 that is closer (e.g., radially closer) to wire bundle 202 than first fastener seat 246 and second fastener seat 254 (e.g., shoulders 240, 248 are raised relative to middle region 256 such that first fastener seat 246 and second fastener seat 254 are elevated relative to mounting seat 258). In some embodiments, first and second end regions 236, 238 may not include shoulders 240, 248 (e.g., first ribs 242, 244 and second ribs 250, 252 may still define first and second fastener seats 246, 254, respectively, but first and second fastener seats 246, 254 may have the same elevation as mounting seat 258). In other embodiments, first shell 222 and second shell 224 may not include outer first rib 244 and outer second rib 252 (i.e., inner first rib 242 and inner second rib 250 still segment outer surface 234 of shells 222, 224 into end regions 236, 238 and middle region 256). Alternatively, first shell 222 and second shell 224 may not have any ribs 242, 244, 250, 252 such that outer surface 234 is not segmented into regions.

In the exemplary embodiment, one of first shell 222 and second shell 224 has a tab receiving space 255, and the other of first shell 222 and second shell 224 has a corresponding tab 257 configured for insertion into tab receiving space 255 when first shell 222 and second shell 224 are coupled together about wire bundle 202 as described in more detail below. Tab receiving space 255 and tab 257 interface with one another in a manner that facilitates restricting displacement of first shell 222 and second shell 224 relative to one another when coupled together about wire bundle 202. In one embodiment, one tab receiving space 255 and one corresponding tab 257 are located on opposing sides of mounting device 220. Alternatively, mounting device 220 may have any suitable number of tab receiving spaces 255 and corresponding tabs 257 that facilitate enabling mounting device 220 to function as described herein.

To couple mounting device 220 to wire bundle 202, first and second shells 222, 224 are seated against wire bundle 202 to define gaps 230, 232, and tabs 257 are inserted into tab receiving spaces 255. Fasteners 226 are then coupled relatively loosely about first and second shells 222, 224 on fastener seats 246, 254 (e.g., first shell 222 and second shell 224 are maintained in contact with wire bundle 202 but are slidable together along wire bundle 202). Fasteners 226 are then tightened such that first shell 222 and second shell 224 are displaced toward one another, thereby reducing gaps 230, 232 such that first shell 222 and second shell 224 are no longer slidable along wire bundle 202 (e.g., first shell 222 and second shell 224 are displaced toward one another in order to compress wire bundle 202 such that the compression forces restrict movement of first shell 222 and second shell 224 along wire bundle 202). Because fasteners 226 are seated on fastener seats 246, 254 between first ribs 242, 244 and second ribs 250, 252, respectively, fasteners 226 are restricted from moving along wire bundle 202 relative to first shell 222 and second shell 224. Tabs 257 disposed within tab receiving spaces 255 facilitate restricting displacement of shells 222, 224 relative to one another along wire bundle 202. It should also be noted that for all embodiments described herein, while first shell 222 and second shell 224 are described as being configured for coupling to wire bundle 202 using mechanical fasteners 226, an adhesive disposed between shells 222, 224 and wire bundle 202 may be used in lieu of, or in addition to, fasteners 226 to facilitate securing shells 222, 224 to wire bundle 202.

After mounting device 220 is coupled to wire bundle 202 in the manner described above, mounting device 220 may be coupled to gas turbine engine 100 by being engaged within a fastening mechanism (e.g., a broom clip, clam shell clip, or p-clamp) that is fixed to a suitable surface of gas turbine engine 100 (e.g., a casing of gas turbine engine 100) such that the fastening mechanism of gas turbine engine 100 is seated against mounting seat 258 between inner first and second ribs 242, 250. Because the fastening mechanism is coupled to mounting device 220 between inner first and second ribs 242, 250, mounting device 220 is restricted from moving relative to the fastening mechanism, thereby fixing electrical harness 200 at desired location(s) on gas turbine engine 100 during operation. In some embodiments, a plurality of mounting devices 220 may be provided in a kit. Each mounting device 220 in the kit may have substantially the same outer surface contour (e.g., outer diameter) for mounting seat 258, while each mounting device 220 in the kit may have a different inner surface contour (e.g., inner diameter) for inner surfaces 228. This would minimize variation amongst the fastening mechanisms (e.g., broom clips) of gas turbine engine 100 while allowing for variation in the diameter of wire bundle 202, thereby resulting in more uniformity and reduced costs associated with the fastening mechanisms of gas turbine engine 100.

In the event that replacement, repair, or relocation of electrical harness 200 is desired, each mounting device 220 may simply be detached from its associated fastening mechanism of gas turbine engine 100, and its fasteners 226 may simply be removed from first shell 222 and second shell 224 to enable detachment of first shell 222 and second shell 224 from wire bundle 202. In this manner, first and second shells 222, 224 do not need to be discarded upon removal from wire bundle 202 and may subsequently be reattached to a new, repaired, or relocated wire bundle 202 in the same manner as described above (e.g., either using the previous fastener(s) 226 or new fastener(s) 226 depending, at least in part, upon the condition of the previous fasteners 226 and/or the method by which the previous fasteners 226 were removed from first shell 222 and second shell 224). Similarly, first shell 222 and/or second shell 224 may be replaced or repaired as desired. As such, mounting devices 220 are more easily coupled to and uncoupled from wire bundle 202 such that mounting devices 220 are more easily removed and/or repaired, replaced, or relocated in the field. Additionally, mounting device 220 is configured to be coupled to wire bundle 202 at desired mounting locations of wire bundle 202 without having to slide mounting device 220 over connector assemblies 204 and/or breakout segments 216, thereby providing easier coupling of mounting devices 220 to wire bundle 202 at desired mounting locations for electrical harness 200. Thus, mounting device 220 does not need to be thermally expanded or shrunk in order to be coupled to wire bundle 202, which enables mounting device 220 to be fabricated from more rigid and resilient materials (e.g., higher temperature rated materials).

Figure 6:
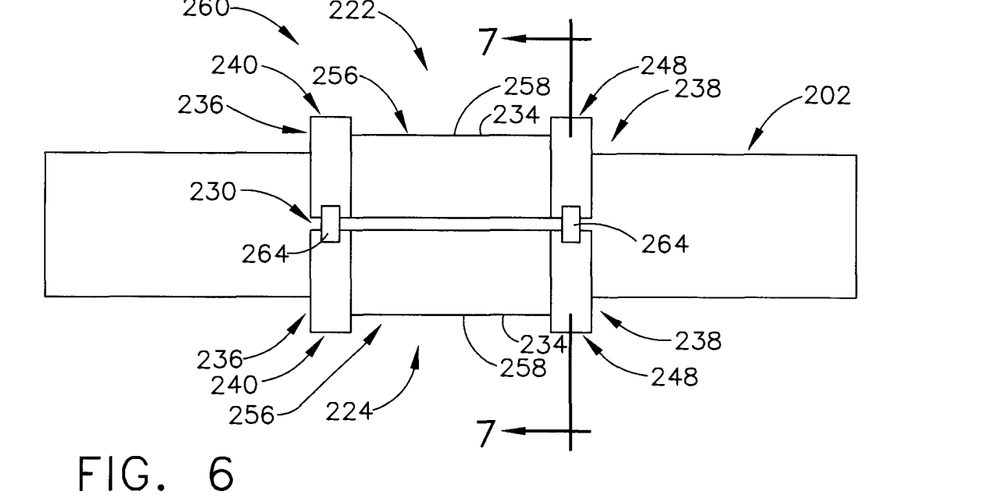
FIG. 6 is a schematic side illustration of a second embodiment of a mounting device of the electrical harness shown in FIG. 2.
Figure 7:
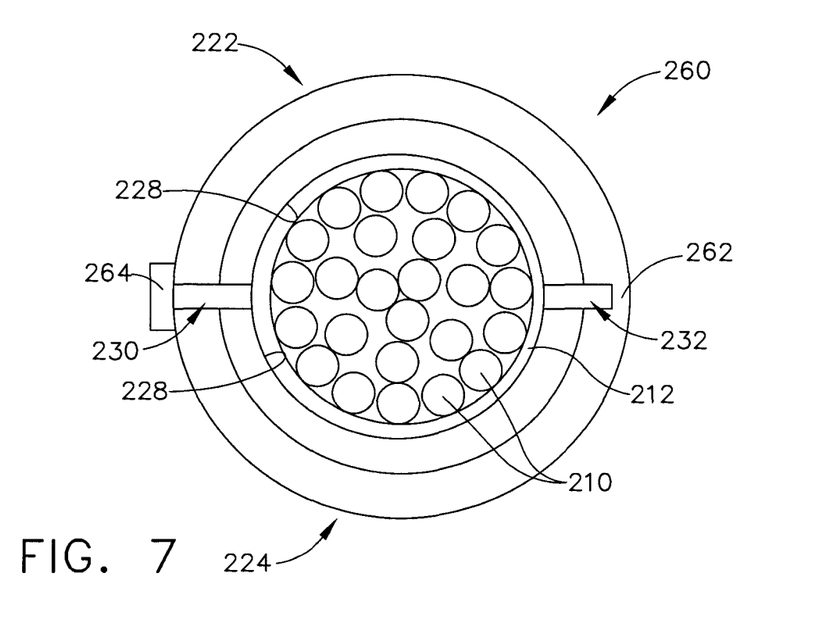
FIG. 7 is a schematic cross-sectional illustration of the mounting device shown in FIG. 6 and taken along line 7-7.

FIG. 6 is a schematic side illustration of a second embodiment of a mounting device 260, and FIG. 7 is a schematic cross-sectional illustration of mounting device 260 taken along line 7-7. Mounting device 260 is similar to mounting device 220 of FIGS. 4 and 5, and like components are indicated using the same reference numerals used in FIGS. 4 and 5. In the exemplary embodiment, mounting device 260 includes first shell 222 (without ribs 242, 244), second shell 224 (without ribs 250, 252), a hinge 262 coupling first shell 222 to second shell 224 at gap 232, and a plurality of fasteners 264 (e.g., snaps) for detachably coupling first shell 222 to second shell 224 at gap 230 in a clam-shell configuration such that mounting device 260 may be coupled to wire bundle 202 as described below. First shell 222 and second shell 224 may be suitably fabricated from the same materials described above. Similarly, hinge 262 and fasteners 264 may be fabricated from any of the plastic or metallic materials described herein.

In the exemplary embodiment, hinge 262 is formed integrally with first shell 222 and second shell 224. In other embodiments, hinge 262 may be formed separately from, and coupled to, first shell 222 and second shell 224 in any suitable manner. In the exemplary embodiment, fasteners 264 are formed separately from, and coupled to, first shell 222 and second shell 224. In other embodiments, fasteners 264 may be formed integrally with first shell 222 and/or second shell 224. While fasteners 264 are disposed on shoulders 240, 248 in the exemplary embodiment, fasteners 264 may have any suitable location along gap 230 (e.g., in middle region 256). Alternatively, mounting device 260 may have any suitable arrangement of hinge(s) and fastener(s) that facilitates enabling mounting device 260 to function as described herein.

To couple mounting device 260 to wire bundle 202, first shell 222 and second shell 224 are detached from one another at gap 230 via fasteners 264 and are opened relative to one another via hinge 262, thereby enabling wire bundle 202 to be inserted between first shell 222 and second shell 224. With wire bundle 202 disposed between first shell 222 and second shell 224, first shell 222 and second shell 224 are coupled together via fasteners 264. In some embodiments, a bonding material (e.g., an adhesive or a tape) may be disposed between wire bundle 202 and inner surfaces 228 of first shell 222 and/or second shell 224 to facilitate bonding mounting device 260 to wire bundle 202, thereby further restricting movement of mounting device 260 along wire bundle 202. After mounting device 260 is coupled to wire bundle 202, mounting device 260 may be engaged within a fastening mechanism of gas turbine engine 100 in a manner similar to that of mounting device 220 described above.

The methods and systems described herein facilitate providing a mounting device that can be arranged on an electrical harness in a manner that is less influenced by the configuration of breakout segments and connector assemblies of the electrical harness. The methods and systems described herein also facilitate providing a mounting device with restricted lateral movement along a wire bundle of an electrical harness. The methods and systems described herein further facilitate providing a mounting device that is more durable in higher temperature applications. The methods and systems described herein further facilitate providing an improved fit between an electrical harness and fastening system of the engine (e.g. a broom clip), and further facilitate a reduction in engine fastening system sizes needed to mount an electrical harness by compensating for harness bundle diameter variation while maintaining fastening system interface dimensioning. The methods and systems described herein further facilitate providing a more easily relocatable and replaceable mounting device for an electrical harness. The methods and systems described herein therefore facilitate reducing time and costs associated with manufacturing, installing, and maintaining mounting devices.

Exemplary embodiments of a mounting device and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only electrical harnesses of gas turbine engines as described herein. Rather, the embodiments of the present disclosure can be implemented and utilized in connection with many other industries.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mounting device for an electrical harness of a gas turbine engine, the electrical harness having a wire bundle, said mounting device comprising:
    a first semi-cylindrical shell and a second semi-cylindrical shell, said first shell and said second shell hingedly coupled along respective adjacent edges of the first shell and the second shell wherein each of said first shell and said second shell comprises:
        a first end region;
        a second end region; and
        a middle region extending between said first end region and said second end region, wherein said middle region defines a mounting seat having an outer diameter that is less than an outer diameter of said first end region and said second end region; and
    at least one fastener configured to couple said first shell to said second shell with the wire bundle disposed between said first shell and said second shell such that movement of said first shell and said second shell along the wire bundle is restricted.

2. The mounting device of claim 1, wherein each of said first shell and said second shell comprises a generally semi-cylindrical shape such that said first shell and said second shell form a generally cylindrical shape about the wire bundle when said first shell and said second shell are coupled together using the at least one fastener.

3. The mounting device of claim 1, wherein the first semi-cylindrical shell comprises one or more first fastener halves and the second semi-cylindrical shell comprises one or more second fastener halves complementary to the first fastener halves and configured to engage said first fastener halves for coupling the one or more first fastener halves to the one or more second fastener halves.

4. The mounting device of claim 1, wherein said first shell and said second shell are fabricated from a plastic material.

5. The mounting device of claim 1, wherein at least one of the first semi-cylindrical shell and the second semi-cylindrical shell includes an inner surface having a contour configured to facilitate an improved grip of at least one of the first semi-cylindrical shell and the second semi-cylindrical shell on the wire bundle.

6. The mounting device of claim 1, wherein said at least one fastener is fabricated from at least one of a metallic material and a plastic material.

7. A method of assembling a mounting device for an electrical harness of a gas turbine engine, the electrical harness having a wire bundle, said method comprising:
    providing a first semi-cylindrical shell and a second semi-cylindrical shell, wherein each of the first shell and the second shell includes a middle region extending between a first end region comprising a first shoulder and a second end region comprising a second shoulder, the first shell and the second shell hingedly coupled along respective adjacent edges of the first shell and the second shell; and
    coupling the first shell to the second shell such that the middle regions of the first shell and the second shell form a mounting seat having a first diameter that is less than a diameter of the first shoulder and the second shoulder.

8. The method of claim 7, wherein coupling the first shell to the second shell comprises coupling the first shell to the second shell with the wire bundle disposed between the first shell and the second shell to form a cylindrical mounting device positioned around an outer circumference of the wire bundle.

9. The method of claim 7, coupling the first shell to the second shell comprises coupling the first shell to the second shell with the wire bundle disposed between the first shell and the second shell such that movement of the first shell and the second shell along the wire bundle is restricted.

10. The method of claim 7, wherein the first semi-cylindrical shell comprises one or more first fastener halves and the second semi-cylindrical shell comprises one or more second fastener halves complementary to the first fastener halves, and wherein coupling the first shell to the second shell comprises coupling the one or more first fastener halves to the one or more second fastener halves.

11. The method of claim 7, further comprising providing the first shell and the second shell fabricated from a plastic material.

12. The method of claim 7, further comprising providing the first shell and the second shell as being fabricated from a polyetheretherketone (PEEK) material that is rated to at least 260° C.

13. The method of claim 7, wherein providing a first semi-cylindrical shell and a second semi-cylindrical shell comprises providing at least one of the first semi-cylindrical shell and the second semi-cylindrical shell that includes an inner surface having a contour configured to facilitate an improved grip of at least one of the first semi-cylindrical shell and the second semi-cylindrical shell on a wire bundle positioned between the first semi-cylindrical shell and the second semi-cylindrical shell.

14. The method of claim 7, further comprising positioning a bonding material between a wire bundle and an inner surface of the first semi-cylindrical shell and an inner surface of the second semi-cylindrical shell to facilitate bonding the mounting device to the wire bundle restricting movement of the mounting device along the wire bundle.

15. The method of claim 7, further comprising receiving a fastening mechanism at the middle region such that the mounting device is restricted in motion by interference between the fastening mechanism and at least one of the first shoulder and the second shoulder.

16. An electrical harness for a gas turbine engine, said electrical harness comprising:
   a wire bundle comprising a covering and a plurality of wires disposed within said covering; and
   a mounting device coupled to said wire bundle, wherein said mounting device comprises:
      a first shell and a second shell, wherein each of said first shell and said second shell comprises a first end region, a second end region, and a middle region between said first end region and said second end region, wherein said middle region defines a mounting seat having a first diameter that is less than a diameter of said first end region and said second end region; and
      at least one fastener configured to couple said first shell to said second shell with said wire bundle disposed between said first shell and said second shell such that movement of said first shell and said second shell along said wire bundle is restricted.

17. The electrical harness of claim 16, wherein each of said first shell and said second shell comprises a generally semi-cylindrical shape such that said first shell and said second shell form a generally cylindrical shape about the wire bundle when said first shell and said seconds shell are coupled together.

18. The electrical harness of claim 16, wherein said first shell and said second shell are fabricated from a plastic material.

19. The electrical harness of claim 16, wherein said plastic material is a polyetheretherketone (PEEK) material that is rated to at least 260° C.

20. The electrical harness of claim 16, wherein at least one of the said first shell and said second shell includes an inner surface having a contour configured to facilitate an improved grip of at least one of the first semi-cylindrical shell and the second semi-cylindrical shell on the wire bundle.

* * * * *